US011840138B2

(12) United States Patent
Jouanny et al.

(10) Patent No.: US 11,840,138 B2
(45) Date of Patent: Dec. 12, 2023

(54) TEMPERATURE CONTROL SYSTEM FOR A MOTOR VEHICLE

(71) Applicant: Valeo Systemes Thermiques, Le Mesnil Saint-Denis (FR)

(72) Inventors: Philippe Jouanny, Le Mesnil Saint Denis (FR); Cedric Lebert, Le Mesnil Saint Denis (FR); Fabien Bireaud, Le Mesnil Saint Denis (FR); François Charbonnelle, Le Mesnil Saint Denis (FR); Samer Saab, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 79 days.

(21) Appl. No.: 17/434,195

(22) PCT Filed: Feb. 27, 2020

(86) PCT No.: PCT/FR2020/050383
§ 371 (c)(1),
(2) Date: Aug. 26, 2021

(87) PCT Pub. No.: WO2020/174191
PCT Pub. Date: Sep. 3, 2020

(65) Prior Publication Data
US 2022/0169108 A1  Jun. 2, 2022

(30) Foreign Application Priority Data
Feb. 28, 2019 (FR) ..................... 1902117

(51) Int. Cl.
*B60K 11/04* (2006.01)
*F01P 3/18* (2006.01)
(Continued)

(52) U.S. Cl.
CPC ............... *B60K 11/04* (2013.01); *F01P 3/18* (2013.01); *F01P 5/06* (2013.01); *F01P 11/10* (2013.01);
(Continued)

(58) Field of Classification Search
CPC ...... B60L 11/04; F01P 3/18; F01P 5/06; F01P 11/10; F01P 2003/187; F01P 2003/182;
(Continued)

(56) References Cited

U.S. PATENT DOCUMENTS

| 4,156,408 A | 5/1979 | Protze |
| 2016/0272045 A1* | 9/2016 | Chen ................ B60L 58/24 |

FOREIGN PATENT DOCUMENTS

| DE | 3118539 A1 | 12/1982 |
| DE | 3200682 A1 | 7/1983 |

(Continued)

OTHER PUBLICATIONS

International Search Report and Written Opinion in corresponding International Application No. PCT/FR2020/050383, dated Jun. 8, 2021 (13 pages).

*Primary Examiner* — Jacob M Amick
(74) *Attorney, Agent, or Firm* — Osha Bergman Watanabe & Burton LLP

(57) ABSTRACT

The invention relates to a thermal control system (100) for a vehicle, the thermal control system (100) comprising at least one first heat exchanger (110) and at least one second heat exchanger (120) that are arranged in series, the first heat exchanger (110) extending mainly on a first plane (P1) intersecting a second plane (P2) on which the second heat exchanger (120) mainly extends such that the first heat exchanger (110) is closer to the second heat exchanger (120) at respective first ends (111, 121) of the two heat exchangers (110, 120) and the first heat exchanger (110) is farther away (Continued)

from the second heat exchanger (120) at respective second ends (112, 122) of these two heat exchangers (110, 120).

18 Claims, 7 Drawing Sheets

(51) Int. Cl.
*F01P 5/06* (2006.01)
*F01P 11/10* (2006.01)

(52) U.S. Cl.
CPC ... *F01P 2003/182* (2013.01); *F01P 2003/187* (2013.01)

(58) Field of Classification Search
CPC ... F01P 2003/185; B60K 11/08; B60K 11/085
See application file for complete search history.

(56) References Cited

FOREIGN PATENT DOCUMENTS

| | | | |
|---|---|---|---|
| DE | 4227565 C1 | 11/1993 | |
| DE | 102004034313 A1 | 2/2006 | |
| WO | 2016146592 A2 | 9/2016 | |

\* cited by examiner

[Figure 1]
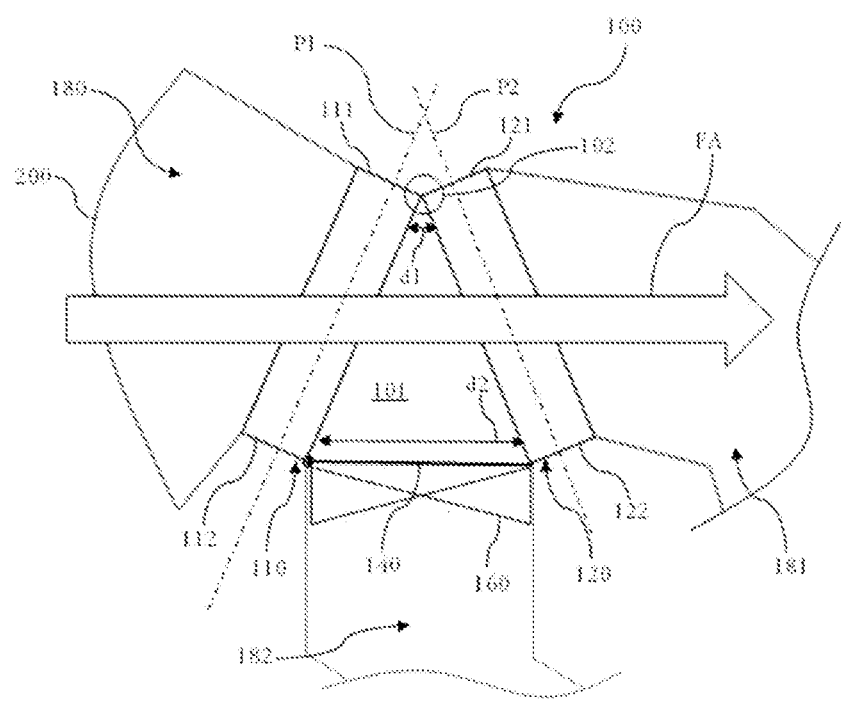

[Figure 2]
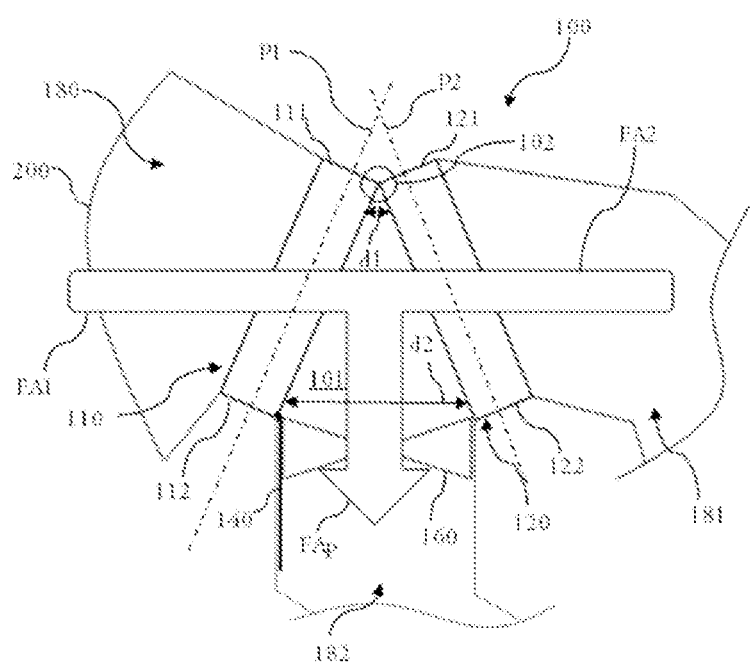

[Figure 2a]
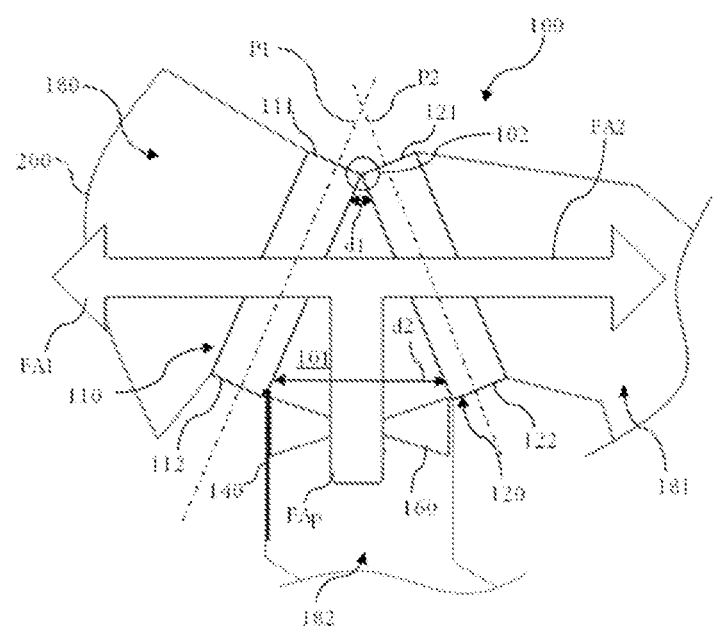

[Figure 3]
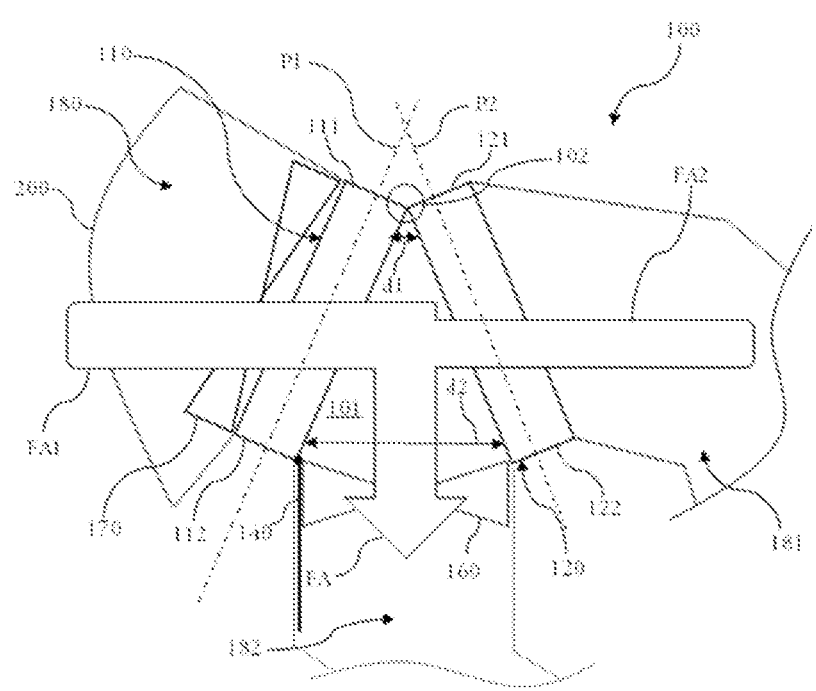

[Figure 4]
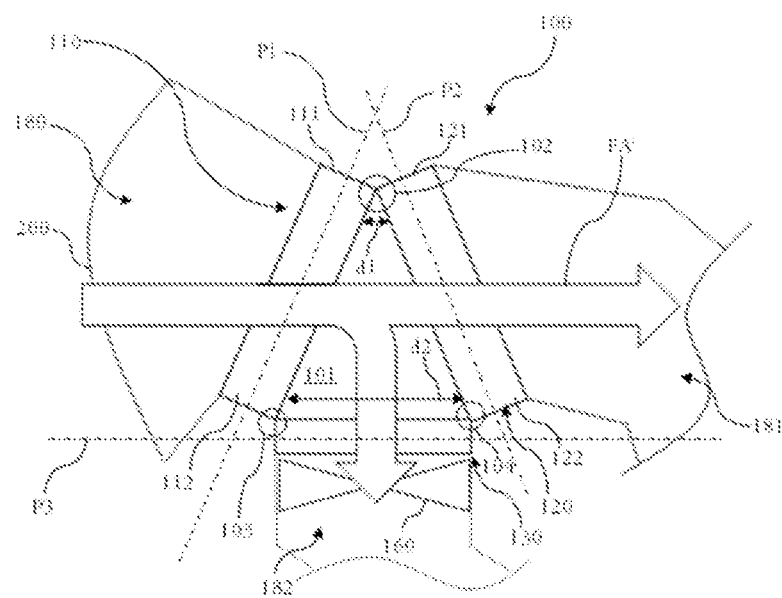

[Figure 5]
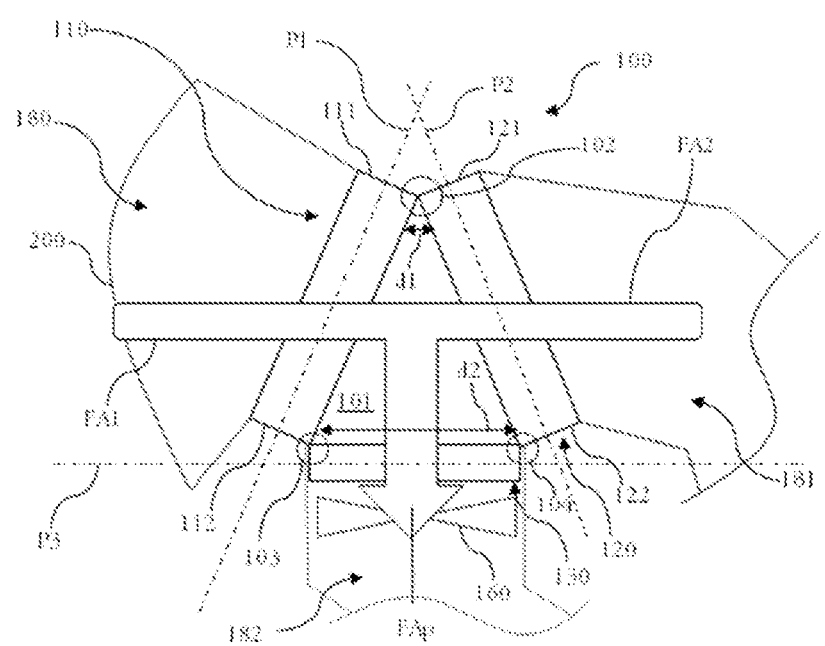

[Figure 6]
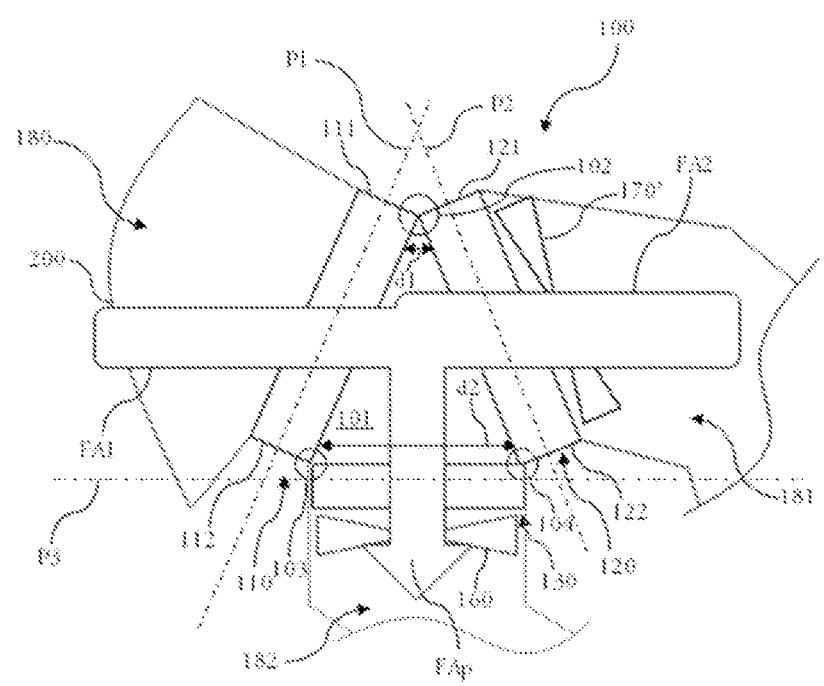

TEMPERATURE CONTROL SYSTEM FOR A MOTOR VEHICLE

The field of the present invention relates to thermal control systems for motor vehicles, and more particularly to thermal control systems intended to be integrated at the front face of such vehicles.

Motor vehicles are commonly equipped with thermal control systems intended for the thermal treatment of the engine thereof, the interior thereof, and optionally other components of this vehicle. Conventionally, these thermal control systems comprise one or more heat exchangers in which there circulates a fluid, for example a refrigerant or a heat-transfer fluid, which is able to exchange heat energy with an air flow passing through these heat exchangers.

In order to pick up a sufficient quantity of air to allow effective cooling of the various elements in question, these heat exchangers are generally arranged at the front face of the vehicle, that is to say in front of the engine compartment of this vehicle. Thus, the air flow intended to pass through the heat exchangers is generated at least partially by the movement of the vehicle. These thermal control systems can also comprise a ventilation device that makes it possible to force the intake of air, for example when the vehicle is at a standstill.

Since the space at the front face of vehicles is relatively restricted, it is common to stack the heat exchangers one after another along a main axis of movement of the vehicle. A drawback of this arrangement resides in the fact that only the first of these heat exchangers, namely the heat exchanger arranged at the farthest forward point of the vehicle, is supplied with fresh air. Specifically, it will be understood that the air flow that passes for example through the second heat exchanger, namely the heat exchanger arranged immediately after the first heat exchanger, has already passed through this first heat exchanger and has thus been partially heated. Hence, the temperature difference between the fluid circulating in the second heat exchanger and the air flow passing through this second heat exchanger is smaller, resulting in a decrease in the thermal efficiency of this second heat exchanger. Of course, this phenomenon of a reduction in efficiency becomes increasingly marked the farther away the exchangers that are further downstream in the direction of air circulation are from the front face.

The present invention falls within this context and proposes a thermal control system in which at least two heat exchangers can, depending on the manner of operation of the control system, be passed through by fresh air, that is to say air that has not passed through any other upstream heat exchanger, while having acceptable dimensions given the location of this thermal control system at the front face.

A subject of the present invention is thus a thermal control system for a vehicle, the thermal control system comprising at least one first heat exchanger and at least one second heat exchanger that are arranged in series, the first heat exchanger extending mainly on a first plane intersecting a second plane on which the second heat exchanger mainly extends such that the first heat exchanger is closer to the second heat exchanger at respective first ends of the two heat exchangers and the first heat exchanger is farther away from the second heat exchanger at respective second ends of these two heat exchangers.

In other words, each heat exchanger has at least one first end and at least one second end, a first distance measured between the first ends of the first heat exchanger and of the second heat exchanger being less than a second distance measured between the second ends of the first heat exchanger and the second heat exchanger, the first distance and the second distance being measured in two parallel directions. As a result, in a random disposition of the thermal control system in the vehicle, in which the first ends of the heat exchangers face toward the hood of the vehicle and the second ends of the exchangers face toward the ground, the first heat exchanger and the second heat exchanger are arranged substantially in the form of an inverted V. Alternatively, provision could be made for the first heat exchanger and the second heat exchanger to be arranged in a V shape without departing from the context of the invention, meaning that, in this alternative, the first distance measured between the first ends of the first heat exchanger and of the second heat exchanger is greater than the second distance measured between the second ends of the first heat exchanger and of the second heat exchanger.

According to one feature of the present invention, at least one ventilation device is arranged at the respective second ends of the two heat exchangers, between the first heat exchanger and the second heat exchanger. According to the invention, this ventilation device is configured to generate at least one main air flow, a first part of which is intended to pass through the first heat exchanger and a second part of which is intended to pass through the second heat exchanger. With the first heat exchanger and the second heat exchanger being arranged substantially in a V shape, it will be understood that the ventilation device generates a first air flow that passes through the first heat exchanger and a second air flow that passes through the second heat exchanger, this first air flow and this second air flow forming, jointly, the main air flow.

It is thus possible to define a running mode of the vehicle, in which the heat exchangers can be passed through in series by one and the same air flow, and an alternative mode in which the heat exchangers are passed through in parallel by a part of a main air flow, these parts coming back together to form the main air flow or resulting from the separation of the main air flow.

According to one feature of the present invention, the ventilation device is controlled such that the first part intended to pass through the first heat exchanger and the second part intended to pass through the second heat exchanger come back together between the first and second heat exchangers to form the main air flow intended to pass through at least the ventilation device. In other words, this ventilation device generates the main air flow by suction. Alternatively, the ventilation device is controlled such that the first part intended to pass through the first heat exchanger and the second part intended to pass through the second heat exchanger result from the separation, between the first and second heat exchangers, of the main air flow generated by the ventilation device. According to this alternative, the ventilation device thus generates the main air flow by blowing.

According to one feature of the invention, the thermal control system may also comprise at least one ventilation member associated with the first and/or with the second heat exchanger and configured to increase the quantity of air made to pass through at least one of the heat exchangers. In other words, it will be understood that this ventilation member helps to generate, together with the ventilation device, the first air flow and/or the second air flow that is/are intended to pass through the first heat exchanger and/or the second heat exchanger. The presence of a ventilation member could be chosen depending on the thermal power necessary for the first heat exchanger compared with the thermal power necessary for the second heat exchanger. Thus, by way of example, when the first heat exchanger has to effect greater heat exchange than the second heat exchanger, it requires a greater input of fresh air than the second heat exchanger, and so the ventilation member will preferably be chosen to be positioned upstream of this first heat exchanger.

When the first heat exchanger and the second heat exchanger exhibit equivalent, or substantially equivalent, respective powers, the thermal control system according to the invention may not have this ventilation member and may then only comprise the ventilation device configured to generate the main air flow made up of the first air flow intended to pass through the first heat exchanger and of the second air flow intended to pass through the second heat exchanger.

According to one exemplary embodiment of the present invention, the thermal control system comprises at least one third heat exchanger arranged between the first heat exchanger and the second heat exchanger, at the respective second ends of the first and second heat exchangers, the three heat exchangers defining, between one another, an internal volume through which the air flow(s) passing through the heat exchangers is/are made to pass. According to this exemplary embodiment of the present invention, the main air flow generated by the ventilation device is intended to pass through at least the first heat exchanger, the second heat exchanger and the third heat exchanger. More specifically, the first air flow passes through the first heat exchanger, the second air flow passes through the second heat exchanger and the third heat exchanger is for its part passed through by the first air flow and by the second air flow once they have passed through the first heat exchanger and the second heat exchanger, respectively. In other words, the first heat exchanger and the second heat exchanger are both supplied with fresh air while the third heat exchanger is supplied with air partially heated by passing through the first heat exchanger or the second heat exchanger.

Although the third heat exchanger is passed through by partially heated air, it will be understood that the thermal control system according to this exemplary embodiment exhibits thermal performance that is better than the thermal control system that comprises only two heat exchangers.

According to the invention, the ventilation device is arranged next to the third heat exchanger, outside the internal volume defined by the three heat exchangers. As specified above, the ventilation device is configured and controlled to generate the main air flow by suction or by blowing depending on the desired direction of circulation of the main air flow.

Optionally, the thermal control system comprising three heat exchangers may also comprise a ventilation member as described above, meaning that this thermal control system could then comprise a ventilation member arranged upstream of the first heat exchanger or upstream of the second heat exchanger. The addition of this ventilation member will be carried out for the same reasons as set out above.

According to one feature of the present invention, the first and the second heat exchangers are configured so as to have a sealed junction at their respective first ends. In other words, this sealed junction is provided at the respective ends of the heat exchangers between which the measured distance is smallest.

For example, this sealed junction may be realized by contact between the first heat exchanger and the second heat exchanger. Alternatively, a shutoff element is disposed between this first heat exchanger and this second heat exchanger. At any rate, this sealed junction makes it possible to avoid losses of air and thus to maximize the thermal efficiency of the thermal control system according to the invention.

Advantageously, the thermal control system may also comprise at least one controllable shutoff element arranged between the first heat exchanger and the second heat exchanger, at their respective second ends. The presence of such a shutoff element makes it possible to optimize the thermal performance regardless of the situation of the vehicle, namely a running mode of the vehicle, in which the heat exchangers can be passed through in series by one and the same air flow without this air flow escaping at the gap between the two ends of the heat exchangers, and an alternative mode in which each of the heat exchangers can be passed through by a part of a main air flow generated in particular by the control of a ventilation device when the vehicle is at a standstill.

Further details, features and advantages will become more clearly apparent upon reading the detailed description given below by way of indication and with reference to the various exemplary embodiments illustrated in the following figures:

[FIG. 1] and [FIG. 2] schematically illustrate a thermal control system according to a first exemplary embodiment of the present invention, [FIG. 1] illustrating a situation in which a vehicle integrating this thermal control system is in a running phase and [FIG. 2] illustrating a situation in which the vehicle is at a standstill;

[FIG. 2a] illustrates a first variant of the first exemplary embodiment of the present invention illustrated in [FIG. 1] and in [FIG. 2], [FIG. 2a] more specifically illustrating a variant to the situation in which the vehicle is at a standstill;

[FIG. 3] schematically illustrates the thermal control system according to a second variant of the first exemplary embodiment of the present invention illustrated in [FIG. 1] and in [FIG. 2], [FIG. 3] illustrating a situation in which the vehicle is at a standstill;

[FIG. 4] and [FIG. 5] schematically illustrate a thermal control system according to a second exemplary embodiment of the present invention, [FIG. 4] illustrating a situation in which a vehicle integrating this thermal control system is in a running phase and [FIG. 5] illustrating a situation in which the vehicle is at a standstill;

[FIG. 6] schematically illustrates the thermal control system according to a variant of the second exemplary embodiment of the present invention illustrated in [FIG. 4] and in [FIG. 5], [FIG. 6] illustrating a situation in which the vehicle is at a standstill.

In the rest of the description, the terms "upstream" and "downstream" refer to a direction of circulation of a main air flow, of a first air flow or of a second air flow that are intended to pass through a first heat exchanger and/or a second heat exchanger and/or a third heat exchanger. According to the invention, the first air flow and the second air flow jointly participate in forming the main air flow.

[FIG. 1] and [FIG. 2] schematically illustrate a thermal control system 100 according to a first exemplary embodiment of the present invention. This thermal control system 100 is intended to be integrated into a vehicle, for example a motor vehicle, and more particularly in, or in the vicinity of, a front face 200 of such a vehicle.

The thermal control system 100 according to the first exemplary embodiment comprises at least one first heat exchanger 110 and at least one second heat exchanger 120 arranged in series. In general, the first heat exchanger 110 and the second heat exchanger 120 comprise at least one heat-exchange zone in which a fluid circulates, for example a refrigerant or a heat-transfer fluid, which is configured to exchange heat energy with an air flow passing through this heat-exchange zone. The first heat exchanger 110 and the second heat exchanger 120 are arranged for example in two separate cooling loops, each one intended to cool particular components of the vehicle. Alternatively, provision could be made for the first heat exchanger 110 and the second heat exchanger 120 to be arranged in a single cooling loop, meaning that, according to this alternative, the first heat exchanger 110 and the second heat exchanger 120 are dedicated to cooling the same components.

According to the invention, the two heat exchangers are arranged so as not to be disposed parallel to one another. The first heat exchanger 110 extends such that it is centered, in a longitudinal and vertical plane as illustrated in [FIG. 1], on a first axis depicted in [FIG. 1] by the axis P1. The second heat exchanger 120 extends such that it is centered, in this same longitudinal and vertical plane illustrated in [FIG. 1], on a second axis depicted in [FIG. 1] by the axis P2. It will be understood that the two heat exchangers extend substantially perpendicularly to the longitudinal direction, that is to say to the direction of forward movement of the vehicle, and so it is possible to define a first plane P1 defining the position of the first heat exchanger and a second plane P2 defining the position of the second heat exchanger. The first plane P1 and the second plane P2 intersect.

As a result of the above, the first heat exchanger 110 is closer to the second heat exchanger 120 at respective first ends 111, 121 of the two heat exchangers 110, 120 and the first heat exchanger 110 is farther away from the second heat exchanger 120 at respective second ends 112, 122 of these two heat exchangers 110, 120. In other words, a first distance d1 measured between the first end 111 of the first heat exchanger 110 and the first end 121 of the second heat exchanger 120 is smaller than a second distance d2 measured between the second end 112 of the first heat exchanger 110 and the second end 122 of the second heat exchanger 120, this first distance d1 and this second distance d2 being measured along two parallel straight lines.

A shutoff element 140 is disposed between the second ends 112, 122 of the first and second heat exchangers 110, 120. Thus, the first heat exchanger 110, the second heat exchanger 120 and this shutoff element 140 delimit, jointly, an internal volume 101 of the thermal control system 100. According to the invention, this shutoff element 140 is able to move between a shutoff position, in which it closes the internal volume 101 of the thermal control system 100, and an open position, in which it leaves this internal volume 101 accessible. For example, this shutoff element 140 may be a movable flap, the shutoff position of which is illustrated for example in [FIG. 1] and the open position of which is illustrated for example in [FIG. 2].

Advantageously, a sealed junction 102 is also created between the first end 111 of the first heat exchanger 110 and the first end 121 of the second heat exchanger 120 so as to avoid any loss of air. According to the exemplary embodiments illustrated here, this sealed junction 102 is created by contact, meaning that the first end 111 of the first heat exchanger 110 is in contact with the first end 121 of the second heat exchanger 120. Alternatively, provision may be made for this sealed junction 102 to be created by virtue of a sealing device, for example a seal, arranged between the first end 111 of the first heat exchanger 110 and the first end 121 of the second heat exchanger 120.

According to the example illustrated, the first heat exchanger 110 and the second heat exchanger 120 are arranged in the form of an inverted V, with the first ends of the heat exchangers in contact with one another being arranged vertically above the second ends of the heat exchangers. It should be noted that this is only one exemplary embodiment, and these heat exchangers 110, 120 could, alternatively, be arranged in the form of a V without departing from the context of the present invention. In other words, the closeness of the first heat exchanger to the second heat exchanger could be realized at their respective second ends and the spacing apart of the first heat exchanger from the second heat exchanger could be realized at their respective first ends without having a negative effect on the invention.

The thermal control system 100 according to the first exemplary embodiment also comprises at least one ventilation device 160 arranged at the respective second ends 112, 122 of the first heat exchanger 110 and the second heat exchanger 120. In the example illustrated, the ventilation device 160 is more particularly arranged between the second end 112 of the first heat exchanger 110 and the second end 122 of the second heat exchanger 120, and so as to be disposed outside the internal volume 101 of the control system 100.

The control system 100 according to the first exemplary embodiment also comprises at least one first air duct 180 and at least one second air duct 181, the first air duct 180 being arranged between the front face 200 of the vehicle and the first heat exchanger 110 and the second air duct 181 being arranged between the second heat exchanger 120 and an environment external to the vehicle. Furthermore, the control system 100 in this case has a third air duct 182 arranged at the second ends of the heat exchangers so as to allow the introduction of air into or the extraction of air from the internal volume 101 defined by the two heat exchangers and the shutoff element as defined above.

The ventilation device 160 is arranged in the third air duct 182 and it should be noted that the depiction here is schematic in that this ventilation device could be arranged in a different position in the third air duct 182, and in particular in a position farther away from the second ends of the heat exchangers so as to allow the shutoff element to pivot between the shutoff position and the open position in which, respectively, the shutoff element prevents and allows the passage of air between the internal volume 101 and the third air duct 182.

[FIG. 1] illustrates a situation in which the vehicle in which the thermal control system 100 according to the invention is integrated is in a running phase. In this situation, the movement of the vehicle generates an air flow FA that enters the vehicle through the front face 200, passes through the first heat exchanger 110 by following the first air duct 180, then passes through the second heat exchanger 120 before leaving the thermal control system 100 by following the second air duct 181. As a result, the air flow passing in through the front face passes successively through the two heat exchangers arranged in series. The expression "passes through the first/second heat exchanger" is understood here as meaning that the air flow in question passes through the heat-exchange zone of the heat exchanger in question and exchanges heat energy with the fluid circulating in this heat-exchange zone as mentioned above. The fluid thus cooled is then able to follow the cooling loop in which the heat exchanger in question is arranged, in order to cool the various components arranged in this cooling loop.

In order to ensure that a maximum amount of air passes both through the first heat exchanger 110 and through the second heat exchanger 120, it is necessary to avoid any loss of air, and so the shutoff element 140 is in its shutoff position. In this situation, the two heat exchangers are passed through successively by one and the same air flow, in a conventional manner similar to that of an arrangement in which two exchangers are arranged in series in a parallel manner one behind the other. Only the first heat exchanger 110 is supplied with fresh air, the second heat exchanger 120 being supplied with air that has already been partially heated by passing through the first heat exchanger 110.

For its part, [FIG. 2] illustrates a situation in which the vehicle integrating the thermal control system 100 according to the invention is at a standstill but requires significant cooling. Such a situation is found for example in electric or hybrid vehicles when an electrical energy storage device intended to at least partially supply a drive motor of the vehicle is in a rapid-charging phase. A "rapid-charging phase" is understood to be a phase during which a large amount of electrical energy is sent to this electrical energy storage device in a very short time. As a result, this electrical energy storage device heats up, this being intended to be alleviated by the improvement in the enhanced thermal performance of the thermal control device according to the invention, as the following description teaches.

Thus, when the vehicle is at a standstill and some of its components need to be cooled, such as its electrical energy storage device, for example, the ventilation device 160 can be started up and the shutoff element 140 can pass into its open position. The ventilation device 160 is in this case configured to operate in suction mode, so as to generate, for the one part, a first air flow FA1 that originates from the first air duct 180 and is intended to pass through the first heat exchanger 110 and, for the other part, a second air flow FA2 that originates from the second air duct 181 and is intended to pass through the second heat exchanger 120, this first air flow FA1 and this second air flow FA2 coming back together, according to the example illustrated here, in the internal volume 101 of the thermal control system in order to form a main air flow FAp, which can then be discharged via the passage that is provided between the two heat exchangers and opened up here by the open position of the shutoff element 140. The main air flow FAp is subsequently discharged from the vehicle through the third air duct 182. The present invention therefore allows the first heat exchanger 110 and the second heat exchanger 120, on account of their relative positions, to both be passed through by fresh air. Thus, the temperature difference between the air that passes respectively through the heat-exchange zone of the first heat exchanger 110 and through the heat-exchange zone of the second heat exchanger 120 and the fluid that circulates in each of these heat-exchange zones is maximized, thereby improving the exchanger of heat energy that is effected in these heat-exchange zones as described above. Since the respective first ends of the first and second heat exchangers 110, 120 are connected by the above-described sealed junction 102, the first and second heat exchangers 110, 120 can be supplied only by the air flows FA1, FA2 generated by the ventilation device 160 operating in suction mode, and so there is precise management of the quantities of air that pass through the first heat exchanger 110 and the second heat exchanger 120 and of the source of this air.

According to the example illustrated in [FIG. 2], the ventilation device 160 is arranged downstream of the first heat exchanger 110 and of the second heat exchanger 120 in relation to a direction of circulation of the main air flow FAp. In other words, this ventilation device 160 generates the main air flow FAp by suction.

In a first variant illustrated in [FIG. 2a], the thermal control system is configured such that the air flows FA1, FA2 pass through the first and the second heat exchangers, respectively, from the internal volume 101 to the corresponding air duct 180, 181. More particularly, the ventilation device 160 is configured to operate in blowing mode, thereby generating a main air flow FAp in the third air duct 182 and pushing it into the internal volume 101 of the thermal control system, this main air flow then splitting into the first air flow and the second air flow that are intended to pass through the first heat exchanger and the second heat exchanger, respectively. Here too, it will be understood that the position of the ventilation device is schematically illustrated and that this ventilation device could be disposed in the third air duct at a distance from the shutoff element and from the passage provided between the second ends of the heat exchangers, so as to push the main air flow toward this passage and the internal volume into which the third air duct opens. In contrast to the illustration in [FIG. 2], the thermal control system is in this case configured such that the ventilation device 160 is arranged upstream of the first heat exchanger 110 and of the second heat exchanger 120 with respect to the paths of the air flows.

In each of the examples described, and in the following text, the ventilation device 160 is advantageously in the form of a motorized fan unit with which a control module (not illustrated here) is associated, said control module being configured to control at least the starting and stopping of the drive motor of the fan, optionally the rotational speed of the rotor in order to set the size of the air flow made to pass through the heat exchangers, and, if necessary, the direction of rotation of the motor and of the blades of the fan if the latter is able to operate in both suction mode and in blowing mode.

Since the space available at the front face 200 of the vehicle is relatively limited, it will be understood that this particular arrangement of the fan device 160 with respect to the first heat exchanger 110 and with respect to the second heat exchanger 120 makes it possible to supply fresh air both to this first heat exchanger 110 and to this second heat exchanger 120 and also to maximize the thermal performance of these two heat exchangers 110, 120, for example in order to alleviate a need for localized cooling of the vehicle, while limiting the total size of the thermal control system 100 according to the invention so that it can be integrated easily into said front face 200 of the vehicle.

For its part, [FIG. 3] schematically illustrates a second variant of this first exemplary embodiment of the present invention, according to which the thermal control system 100 also comprises a ventilation member 170 arranged in the first air duct 180, that is to say outside the internal volume 101 of the thermal control system 100.

When the vehicle is not in a running phase—this particular situation not being shown here—the ventilation member can be activated in order to increase the flow rate of the air flow generated by the movement of the vehicle and configured to pass through the first heat exchanger and the second heat exchanger.

When the vehicle is at a standstill and exhibits a need for localized cooling, as mentioned above and illustrated in [FIG. 3], this ventilation member 170 helps to generate the first air flow FA1 that is intended to pass through the first heat exchanger 110 and is involved in forming the main air flow FAp. According to the example illustrated here, this ventilation member 170 is thus arranged upstream of the first heat exchanger 110 in relation to a direction of circulation of the first air flow FA1, such that this ventilation member 170 helps to form this first air flow FA1 by blowing. For example, this ventilation member may be a motorized fan unit controlled as described above for the ventilation device 160.

This variant of the first exemplary embodiment may be implemented for example if the power of the first heat exchanger 110 is greater than a power of the second heat exchanger 120, in other words when the first heat exchanger 110 has a greater need for air than the second heat exchanger 120. For example, this second variant will be preferred if the needs for cooling of the elements thermally treated by the first heat exchanger 110, that is to say the elements arranged in the cooling loop in which the first heat exchanger 110 is arranged, are greater than the needs for cooling of the elements thermally treated by the second heat exchanger 120.

Otherwise, the second variant of the first exemplary embodiment illustrated in [FIG. 3] is entirely identical to the first exemplary embodiment illustrated in [FIG. 1] and [FIG. 2]. The description that has been given of this first exemplary embodiment thus applies, mutatis mutandis, to [FIG. 3].

According to another variant of the first exemplary embodiment that is not illustrated here, the ventilation member disposed outside the internal volume 101 is arranged in the second air duct configured to be followed by the second flow intended to supply the second heat exchanger, and upstream of this second heat exchanger. Thus, according to this other variant, the ventilation member helps to generate, by blowing, the second air flow which supplies the second heat exchanger and is involved in forming the main air flow. In an analogous manner to the above description with reference to [FIG. 3], this other variant will be chosen when the need for heat exchange of the second heat exchanger is greater than the need for heat exchange of the first heat exchanger.

[FIG. 4] and [FIG. 5] schematically illustrate the thermal control system 100 according to a second exemplary embodiment of the present invention, which differs from the first exemplary embodiment in particular in that it comprises a third heat exchanger 130 arranged in the third air duct 182. In general, this third heat exchanger 130 has a heat-exchange zone in which a fluid circulates, for example a refrigerant or a heat-transfer fluid, which is able to exchange heat energy with an air flow that passes through this heat-exchange zone. The fluid thus cooled can thus cool the various elements arranged in a cooling loop carrying the third heat exchanger 130. According to the invention, the third heat exchanger 130 can be arranged in a separate cooling loop from the cooling loops in which the first heat exchanger 110 and the second heat exchanger 120 are arranged. Alternatively, provision may be made for these three heat exchangers to be arranged in one and the same cooling loop or for these three heat exchangers to be distributed over two separate cooling loops.

As illustrated, this third heat exchanger 130 is arranged so as to define a third plane P3 intersecting the above-defined first plane P1 and second plane P2 that are associated with the orientation of the first heat exchanger 110 and of the second heat exchanger 120, respectively. More particularly, this third heat exchanger 130 is arranged between the first heat exchanger 110 and the second heat exchanger 120, and even more particularly between the second end 112 of the first heat exchanger 110 and the second end 122 of the second heat exchanger 120 such that the first heat exchanger 110, the second heat exchanger 120 and the third heat exchanger 130 delimit, jointly, the internal volume 101 of the thermal control system 100.

As a result, the thermal control system 100 according to this second exemplary embodiment does not have a shutoff element. It will also be noted that the ventilation device 160 is, according to this second exemplary embodiment, arranged outside the internal volume 101 of the thermal control system 100.

Advantageously, provision may be made for the thermal control system 100 to have a first sealing zone 103 between the third heat exchanger 130 and the first heat exchanger 110 and a second sealing zone 104 between the third heat exchanger 130 and the second heat exchanger 120. For example, the first sealing zone 103 and/or the second sealing zone 104 may be realized by simple contact between the different heat exchangers in question, or a sealing device, for example a seal, may be arranged therebetween. In an analogous manner to the above description, these sealing zones 103, 104 make it possible to control the quantities and origin of the air flows circulating in the internal volume 101 of the thermal control system 100 and, consequently, to control the quantities and origin of the air flows that pass through the first, second and third heat exchangers 110, 120, 130.

[FIG. 4] illustrates a situation in which the vehicle integrating the thermal control system 100 is in a running phase. As described above, when the vehicle is in a running phase, the movement of this vehicle makes it possible to generate an air flow FA' which passes through all of the heat exchangers. Thus, according to the second exemplary embodiment illustrated in this [FIG. 4], the air flow FA' passes first of all through the first heat exchanger 110 before arriving at the internal volume 101 of the thermal control system 100 in which it is separated in two in order to supply both the second heat exchanger 120 and the third heat exchanger 130. The first heat exchanger 110 is supplied with fresh air, the second heat exchanger 120 and the third heat exchanger 130 both being supplied with air that has already been at least partially heated by passing through the first heat exchanger 110.

For its part, [FIG. 5] illustrates a situation similar to the situation illustrated in [FIG. 2], namely a situation in which the vehicle is at a standstill and exhibits a need for localized cooling greater than normal, for example associated with a rapid-charging phase of the electrical energy storage device of the vehicle. Thus, in this situation, the ventilation device 160 is started up such that at least the first heat exchanger and the second heat exchanger are supplied with fresh air. According to the example illustrated here, the ventilation device 160 is configured to generate the main air flow FAp by suction. As a result, the first air flow FA1 passes through the first heat exchanger 110 before arriving at the internal volume 101 of the thermal control system 100, in which the second air flow FA2 that has passed through the second heat exchanger also arrives. Once recombined in this internal volume 101, the first air flow FA1 and the second air flow FA2 form, jointly, the main air flow FAp, which leaves this internal volume 101, passing through the third heat exchanger 130. Although partially heated, this main air flow FAp is able to exchange heat energy with the fluid circulating in the heat-exchange zone of this third heat exchanger 130 so as to cool the elements arranged in the cooling loop carrying this third heat exchanger 130.

Optionally, provision could be made of a shutoff element arranged against the third heat exchanger, that is to say in the internal volume of the thermal control system delimited by the first heat exchanger, the second heat exchanger and the third heat exchanger so as to bypass the third heat exchanger. Thus, when the vehicle is in a running phase, the shutoff element will, according to this option, be in its shutoff position in order to optimize the exchange of heat energy that takes place in the heat-exchange zone of the second heat exchanger, and when the vehicle requires greater cooling and the vehicle is at a standstill, this shutoff element may be put into its open position so as to allow the third heat exchanger to be supplied and thus make it possible either to cool the elements arranged in the same cooling loop as this third heat exchanger or to improve this cooling if the third heat exchanger is arranged in the same cooling loop as the first heat exchanger and/or the second heat exchanger.

Otherwise, the second exemplary embodiment is identical to the first exemplary embodiment and the description given above with reference to [FIG. 1] and to [FIG. 2] applies, mutatis mutandis, to this second exemplary embodiment.

For its part, [FIG. 6] schematically illustrates a variant of this second exemplary embodiment of the present invention. According to this variant of the second exemplary embodiment of the present invention illustrated in [FIG. 4] and [FIG. 5], the thermal control system 100 also comprises a ventilation member 170' arranged upstream of the second heat exchanger 120 in relation to the direction of circulation of the main air flow FAp. In other words, this ventilation member 170' helps to generate the main air flow FAp by blowing. More particularly, it is noted that this ventilation member 170' is arranged in the second air duct 181 for conveying or discharging the second air flow FA2 intended to supply the second heat exchanger 120. It will therefore be understood that this ventilation member 170' helps to generate the second air flow FA2 that is intended to pass through the second heat exchanger 120 and is involved in forming the main air flow FAp. As described above for other exemplary embodiments, this ventilation member 170' may have a motorized fan unit and a control member suitable for controlling the motor of this motorized fan unit.

This variant of the second exemplary embodiment may thus be implemented for example if the power of the second heat exchanger 120 is greater than a power of the first heat exchanger 110, in other words when the second heat exchanger 120 has a greater need for air than the first heat exchanger 110. This variant of the second exemplary embodiment will be preferred in particular if the needs for cooling of the elements thermally treated by the second heat exchanger 120 are greater than the needs for cooling of the elements thermally treated by the first heat exchanger 110.

Otherwise, the variant of the second exemplary embodiment illustrated in [FIG. 6] is entirely identical to the second exemplary embodiment illustrated in [FIG. 4] and [FIG. 5]. The description that has been given of this second exemplary embodiment thus applies, mutatis mutandis, to [FIG. 6].

According to another variant of the second exemplary embodiment that is not illustrated here, the ventilation member is arranged in the first air duct configured to be followed by the first air flow intended to supply the first heat exchanger, and upstream of this first heat exchanger. Thus, according to this other variant, the ventilation member helps to generate, by blowing, the first air flow which supplies the first heat exchanger and is involved in forming the main air flow.

The present invention thus proposes a thermal control system that is simple and inexpensive to manufacture, the size of which is compatible with an arrangement of this thermal control system at the front face of a motor vehicle, for the one part, and the thermal performance of which can be locally improved, for the other part, for example in order to meet a need for localized cooling of a vehicle in which such a thermal control system is integrated.

The present invention is not limited to the means and configurations described and illustrated in the present document, however, but also extends to all equivalent means and configurations and to any technically functional combination of such means. In particular, the shape and the disposition of the heat exchangers, of the ventilation device and/or of the ventilation member can be modified without having a negative effect on the invention, provided that they perform the functions described above.

The invention claimed is:

1. A thermal control system for a vehicle comprising:
    at least one first heat exchanger in which a fluid circulates; and
    at least one second heat exchanger in which the fluid circulates;
    the first and second heat exchangers being arranged in series, the first heat exchanger extending mainly on a first plane intersecting a second plane on which the second heat exchanger mainly extends such that the first heat exchanger is closer to the second heat exchanger at respective first ends of the two heat exchangers and the first heat exchanger is farther away from the second heat exchanger at respective second ends of these two heat exchangers; and
    wherein the first and the second heat exchangers are configured so as to have a sealed junction at their respective first ends.

2. The thermal control system as claimed in claim 1, wherein at least one ventilation device is arranged at the respective second ends of the two heat exchangers, between the first heat exchanger and the second heat exchanger.

3. The thermal control system as claimed in claim 2, wherein the ventilation device is configured to generate at least one main air flow, a first part of which is intended to pass through the first heat exchanger and a second part of which is configured to pass through the second heat exchanger.

4. The thermal control system as claimed in claim 3, wherein the ventilation device is controlled such that the first part configured to pass through the first heat exchanger and the second part configured to pass through the second heat exchanger come back together between the first and second heat exchangers to form the main air flow configured to pass through at least the ventilation device.

5. The thermal control system as claimed in claim 1, comprising at least one third heat exchanger arranged between the first heat exchanger and the second heat exchanger, at the respective second ends of the first and second heat exchangers, the three heat exchangers defining, between one another, an internal volume through which the air flow(s) passing through the heat exchangers is/are made to pass.

6. The thermal control system as claimed in claim 5, wherein the main air flow generated by the ventilation device is configured to pass through at least the first heat exchanger, the second heat exchanger and the third heat exchanger.

7. The thermal control system as claimed in claim 6, wherein the ventilation device is arranged next to the third heat exchanger, outside the internal volume defined by the three heat exchangers.

8. The thermal control system as claimed in claim 1, comprising at least one controllable shutoff element arranged between the first heat exchanger and the second heat exchanger, at their respective second ends.

9. The thermal control system as claimed in claim 1, further comprising at least one ventilation member associated with the first and/or with the second heat exchanger and configured to increase the quantity of air made to pass through at least one of the heat exchangers.

10. A thermal control system for a vehicle comprising:
at least one first heat exchanger; and
at least one second heat exchanger;
the first and second heat exchangers being arranged in series, the first heat exchanger extending mainly on a first plane intersecting a second plane on which the second heat exchanger mainly extends such that the first heat exchanger is closer to the second heat exchanger at respective first ends of the two heat exchangers and the first heat exchanger is farther away from the second heat exchanger at respective second ends of these two heat exchangers; and
wherein the first and the second heat exchangers are configured so as to have a sealed junction at their respective first ends to avoid losses of air between the first heat exchanger and the second heat exchanger in the system.

11. The thermal control system as claimed in claim 10, wherein at least one ventilation device is arranged at the respective second ends of the two heat exchangers, between the first heat exchanger and the second heat exchanger.

12. The thermal control system as claimed in claim 11, wherein the ventilation device is configured to generate at least one main air flow, a first part of which is intended to pass through the first heat exchanger and a second part of which is configured to pass through the second heat exchanger.

13. The thermal control system as claimed in claim 12, wherein the ventilation device is controlled such that the first part configured to pass through the first heat exchanger and the second part configured to pass through the second heat exchanger come back together between the first and second heat exchangers to form the main air flow configured to pass through at least the ventilation device.

14. The thermal control system as claimed in claim 10, comprising at least one third heat exchanger arranged between the first heat exchanger and the second heat exchanger, at the respective second ends of the first and second heat exchangers, the three heat exchangers defining, between one another, an internal volume through which the air flow(s) passing through the heat exchangers is/are made to pass.

15. The thermal control system as claimed in claim 14, wherein the main air flow generated by the ventilation device is configured to pass through at least the first heat exchanger, the second heat exchanger and the third heat exchanger.

16. The thermal control system as claimed in claim 15, wherein the ventilation device is arranged next to the third heat exchanger, outside the internal volume defined by the three heat exchangers.

17. The thermal control system as claimed in claim 10, comprising at least one controllable shutoff element arranged between the first heat exchanger and the second heat exchanger, at their respective second ends.

18. The thermal control system as claimed in claim 10, further comprising at least one ventilation member associated with the first and/or with the second heat exchanger and configured to increase the quantity of air made to pass through at least one of the heat exchangers.

* * * * *